Patented Aug. 19, 1941

2,252,731

UNITED STATES PATENT OFFICE 2,252,731

METHOD OF PREPARING A SOLUTION OF CELLULOSE

Eric Owen Ridgway, Montclair, and William A. Bodenschatz, Brooklawn, N. J., assignors to Ridbo Laboratories Incorporated, Nutley, N. J., a corporation of New Jersey No Drawing. Original application November 1, 1937, Serial No. 172,152. Divided and this application August 17, 1939, Serial No. 290,626

4 Claims. (Cl. 106—49)

This invention relates to a method of preparing a solution of cellulose having a low ammonia content for the production of rayon.

The invention further contemplates the manufacture of a complete solution of cellulose which may be employed in the manufacture of rayon or stable fibre for the production of spun rayon, or coating fabrics or for other uses.

This application is a divisional application of our copending application Serial No. 172,152, filed November 1, 1937.

In accordance with the present invention, the improved method of preparing a solution of cellulose having a low ammonia content for production of rayon comprises wetting the cellulose in a solution of a water-soluble copper salt, and adding a solution of ammonium hydroxide and an alkaline hydroxide, the reaction being carried out at a low temperature.

The object of the present invention is to produce a solution of cellulose which will have the desired low ammonia concentration necessary for the economical spinning of copper ammonia rayon.

The cellulose concentration of the solution made according to the method of the present invention is adequate for modern spinning practices employing either prepared linters or prepared wood pulp as a source of cellulose and may range up to approximately eight per cent cellulose.

A feature of the invention is the treatment of cellulosic fibres in such a manner that a substantially complete solution of cellulose is obtained and having a very low ammonia content, such that the solution may be spun in a dilute alkali solution and washed with acid and then water, and dried, for the production of spun rayon. The solution of cellulose may, of course, be spun according to any other methods of spinning known in the art.

For example a suitable cellulosic material of known alpha-cellulose content is wetted with a solution of any water-soluble copper salt. Satisfactory results have been obtained by employing copper sulphate, copper nitrate, copper bromide, or copper chloride. The concentration of the copper salt solution is governed by the concentration of cellulose desired in the final solution, that is, a higher cellulose concentration in a finished solution requires a more concentrated copper salt solution. The copper to cellulose ratio and the ammonia to copper ratio are constant, and therefore the variable is the concentration of the copper salt solution.

A satisfactory solution of cellulose can be obtained by wetting the cellulose in a solution of copper sulphate of a concentration of from 100 to 400 grams of copper sulphate per litre and then dissolving the cellulose by slowly adding a solution of ammonium hydroxide and sodium hydroxide of a concentration of from 25 to 117.6 grams of ammonia per litre and from 15 to 94.08 grams of sodium hydroxide per litre, the temperature of the solution being maintained in the neighborhood of 4° centigrade.

The present invention will be readily understood from the following specific example in which the preferred method of employing the invention is given.

369.41 cc. of a copper sulphate solution containing 58.37 grams of $CuSO_4 5H_2O$ are added to 38 grams of dry alpha cellulose such as linters or pulp. After the pulp or linters have been completely opened up and wetted by mixing, 630.59 cc. of a solution containing 28 grams of $NH_3$ and 18.7 grams of NaOH are added. This last solution is added slowly and at a low temperature, for example 4° centigrade; the dissolution of the cellulose takes place more rapidly and completely at a low temperature. Cracked ice may be substituted in part for water to bring the final volume to one litre.

The solution of cellulose is spun in a dilute alkali solution and washed with acid and then with water and finally dried for the production of spun rayon.

It will be seen that in practice more accurate control of the reacting ingredients is obtained by our improved method in which the material being treated is first wetted with a copper salt solution before the ingredients reacting with the copper salt solution and the cellulose are introduced.

It is to be understood that the foregoing example setting forth specific materials, weights and proportions, is given for the purpose only of illustrating the invention, and that our invention is not limited thereto but contemplates such other and further modifications and changes which may become apparent to those skilled in the art.

We claim:

1. The method of preparing a solution of cellulose having a low ammonia content for the production of rayon, which comprises wetting the said cellulose in a solution of copper sulphate of a concentration of from 100 to 400 grams of copper sulphate per litre, dissolving said cellulose by slowly adding a solution containing ammonium hydroxide in a concentration of from 25 to 117.6 grams of ammonia per litre and sodium hydroxide of a concentration of from 15 to 94.08 grams of sodium hydroxide per litre and maintaining the temperature of the resulting solution in the neighborhood of 4° centigrade, said reagents being present in the solutions in approximate proportions of 1.54 parts of copper sulphate ($CuSO_4 5H_2O$) to 1 part of cellulose, 3.13 parts of copper sulphate ($CuSO_4 5H_2O$) to 1 part of sodium hydroxide, and at least 1.5 parts of ammonia to 1 part of sodium hydroxide.

2. The method of preparing a solution of cellulose having a low ammonia content, which comprises wetting said cellulose in a solution of water-soluble copper salt selected from the class consisting of copper sulphate, copper nitrate, copper bromide and copper chloride, and adding a solution of ammonium of hydroxide of at least 25 grams ammonia per litre and an inorganic alkaline hydroxide, the reaction being carried out at a low temperature.

3. The method of preparing a solution of cellulose having a low ammonia content for the production of rayon, which comprises wetting said cellulose in a solution of copper sulphate, and then adding to said wetted cellulose a solution of ammonium hydroxide and sodium hydroxide, the reaction being carried out at a low temperature and said reagents being present in the solutions in approximate proportions of 1.5 parts of ammonia to 1 part of sodium hydroxide, 3.13 parts of copper sulphate ($CuSO_4 5H_2O$) to 1 part of sodium hydroxide, and 1.54 parts of copper sulphate ($CuSO_4 5H_2O$) to 1 part of cellulose.

4. The method of preparing a solution of cellulose having a low ammonia content for the production of rayon, which comprises wetting the cellulosic material in a solution of copper sulphate, and then adding to the wetted material a solution of ammonium hydroxide and sodium hydroxide, the reaction being carried out at a low temperature and in solutions containing approximately 58.37 grams of copper sulphate ($CuSO_4 5H_2O$) in a 369.41 cc. solution, and 28 grams of ammonia and 18.7 grams of sodium hydroxide in a 630.59 cc. solution for each 38 grams of cellulosic material being treated.

WILLIAM A. BODENSCHATZ.
ERIC OWEN RIDGWAY.

CERTIFICATE OF CORRECTION.

Patent No. 2,252,731.　　　　　　　　　　　　　August 19, 1941.

ERIC OWEN RIDGWAY, ET AL.

It is hereby certified that error appears in the printed specification of the above numbered patent requiring correction as follows: Page 2, first column, line 19, claim 2, for "ammonium of hydroxide" read --ammonium hydroxide--; and that the said Letters Patent should be read with this correction therein that the same may conform to the record of the case in the Patent Office.

Signed and sealed this 7th day of October, A. D. 1941.

Henry Van Arsdale,
Acting Commissioner of Patents.

(Seal)